United States Patent Office 2,839,550
Patented June 17, 1958

2,839,550

PROCESS FOR THE MANUFACTURE OF CONDENSATION PRODUCTS OF MONO-UNSATURATED FATTY ACIDS OR ESTERS OF THE SAME

Gerrit Lucas Wiggerink and Everhardus Wilhelmus Jonker, Gouda, Netherlands, assignors to N. V. Koninklijke Stearine Kaarsenfabrieken "Gouda-Apollo," Gouda, Netherlands, a corporation of the Netherlands No Drawing. Application February 11, 1954
Serial No. 409,761

Claims priority, application Netherlands
February 20, 1953

8 Claims. (Cl. 260—404.8)

It is known that by heating unsaturated fatty acids or their esters with dienophilic compounds condensation products are obtained. By dienophilic compounds are understood substances containing a reactive double bond capable of reacting with a conjugated system according to the well-known Diels-Alder reaction, the so-called 1.4 addition. These dienophilic compounds have a double bond between two carbon atoms, at least one of which is bound to a carbonyl group or another negative group, or between two carbon atoms one of which forms part of a terminal methylene group. Examples of such dienophilic compounds are maleic acid anhydride and styrene. With drying or semi-drying oils these compounds yield condensation products which are used inter alia in the lacquer industry.

These condensations can be carried out both with and without catalysts. The condensation of unsaturated fatty acids with maleic acid anhydride without catalysts is described i. a. in British Patent 500,348. According to U. S. Patent 2,306,281 the condensation takes place in the presence of toluene sulphonic acid or other strong acids; according to U. S. Patents 2,374,381, 2,470,752 and 2,470,757 in the presence of organic peroxides; such as benzoyl peroxide, according to U. S. Patent 2,598,634 in the presence of catalysts of the type $(RO)_3P=S$, $(RS)_3P=O$ and $(RS)_3P=S$, in which R represents an alkyl or aryl group having 1–8 C atom.

For the condensation of unsaturated fatty acids with styrene British Patent 647,352 proposes sulphur dioxide and anthraquinone and U. S. Patent 2,586,693 terpenes activated with oxygen as catalysts.

Furthermore it is known from U. S. Patent 2,444,328 that conjugated fatty acids (fatty acids of tung oil) can be condensed with maleic acid anhydride when using a small amount (0.03% calculated on the fatty acids) of iodine as a catalyst.

The invention has for its object a process for the manufacture of condensation products from unsaturated non-conjugated fatty acids or esters thereof, either alone or mixed with other fatty acids and esters thereof, with dienophilic compounds, which is characterized in that the condensation is carried out in the presence of iodine or a compound capable of generating iodine as a catalyst.

By the term "fatty acids" when used in the specification and claims we understand fatty acids having 6–24 carbon atoms.

We have found that iodine, either as such or in the form of a compound capable of generating iodine, is a particularly active catalyst for this condensation, which renders it possible also to obtain excellent condensation products with dienophilic compounds in a very simple manner from the usual drying or semi-drying oils containing no or no appreciable amounts of conjugated fatty acids.

The invention is primarily of importance for the preparation of condensation products with maleic acid anhydride and it will mainly be described with reference to the use of this substance.

Compounds capable of generating iodine within the meaning of the invention are, inter alia, hydroiodic acid, iodine monochloride, iodine trichloride, iodine monobromide, iodine fluorides, iodoform, hydroiodic acid salts of organic bases, for example of hexa decylamine or pyridine and some inorganic iodides e. g. zinc iodide. In actual practice we preferably use iodine but good results are also obtained with hydroiodic acid, iodoform and iodine trichloride.

The proportion of iodine or of the compound capable of generating iodine to be added generally is 0.1–2%, calculated on the weight of the fatty acids. In the case of the fatty acids of semidrying oils we may use for example, amounts of 0.3–0.5% and good results are already obtained with amounts of 0.1–0.3%. In the case of strongly drying fatty acids, such as linseed oil fatty acids, it may be advantageous to use a somewhat higher proportion of iodine, e. g. 1%. With amounts of less than 0.1% satisfactory results are not obtained in most cases.

The reaction temperature may range between 120 and 300° C. but the reaction is preferably carried out at 175–250° C. For different purposes it will be desired to use products of different properties and accordingly of different composition. In order to prepare such different products we may start from fatty acid mixtures containing varying percentages of unsaturated fatty acids and varying relative proportions of fatty acids with one and with more double bonds. We may also allow the conversion to proceed to a greater or lesser extent and use different dienophilic compounds. The degree of conversion depends on the duration of the reaction on one hand and the selection of the above mentioned factors on the other hand. In most cases the condensation is substantially complete after fifteen minutes.

In those cases in which an excess of maleic acid anhydride is used, this excess will generally be removed after the termination of the reaction, e. g. by distillation or by extraction with hot water. In those cases where less maleic acid anhydride is used, the reaction will preferably be so carried out that the anhydride is completely or substantially completely reacted. In this case the reaction mixture may be used without the anhydride being previously removed. It will generally be necessary to remove the catalyst e. g. by a treatment with activated zinc and water or with a solution of sulphite or thiosulphate.

The condensation may be carried out with fatty acid mixtures of different compositions, e. g. products which only contain unsaturated fatty acids having one double bond (oleic acid), or, as is more usual, products which contain both unsaturated acids with one double bond and with two or more double bonds (linoleic acid, linolenic acid, etc.) in widely varying proportions. In both cases saturated fatty acids may also be present. They may further contain unsaturated hydroxy fatty acids and dimers and polymers of unsaturated fatty acids.

It has already been proposed to use iodine as a catalyst for the conjugation of unsaturated fatty acids having two or more double bonds. In the present case, however, the iodine acts quite differently, because iodine is also a very effective catalyst for the condensation claimed under conditions in which a conjugation of the unsaturated fatty acids having two or more double bonds does not proceed in an appreciable degree. Besides it is known that the conjugation of unsaturated fatty acids having two or more double bonds, e. g. linoleic acid, when using iodine only proceeds to about 50%, whereas in the present case the said unsaturated fatty acids are substantially quantitatively converted into condensation products. Iodine also strongly promotes the formation of adducts from unsaturated fatty acids having only one double bond, where a conjugation would obviously be impossible.

It is possible to start both from the free fatty acids and from their esters, more particularly from triglycerides. Suitable starting materials are, for example, animal oils and fats, e. g. the socalled destruction fats (obtained from waste material of animal origin) bone fat, yellow grease, brown grease, whale oil and fish oils, vegetable oils and fats, such as palm oil, soya bean oil, cotton seed oil, sun flower seed oil and linseed oil, and unsaturated, synthetic fatty acids, fatty acids obtained from the above mentioned oils and fats, and mixtures of two or more of the above mentioned products. Said oils, fats and fatty acids may be partly hydrogenated, oxidized and/or polymerized. We may use e. g. the well-known stand oils.

The process may also be applied to fatty acid mixtures or of esters thereof, which besides unsaturated non-conjugated fatty acids contain conjugated fatty acids, such as fatty acids from tung oil, fatty acids from dehydrated castor oil and fatty acids which have been subjected to a conjugating treatment. Fatty acid mixtures or their esters in which the oleic acid is entirely or partly elaidinised may also be condensed with maleic acid anhydride according to the invention.

We may start from both unrefined or refined, e. g. distilled or bleached fatty acids. When distilled fatty acids are used a slightly smaller amount of catalyst will suffice to achieve the same result as with non-distilled fatty acids.

The fatty acid mixtures may be subjected to a preliminary treatment for partly removing the solid fatty acids, e. g. by pressing, by crystallisation from a solvent or by fractional distillation.

In all these cases both the free fatty acids and the corresponding oils and fats can be subjected to the condensation.

An important application of the process according to the invention is the preparation of condensation products from oleine (technical oleic acid), both the oleic acid and the linoleic acid present in small quantities in this technical oleic acid being converted into adducts.

Practical experience has shown that the unsaponifiable constitutents normally found in oils and fats, have no or little influence on the result of the process according to the invention.

The process according to the invention is mainly of importance for the preparation of condensation products with maleic acid anhydride. It is also possible, however, to use other dienophilic compounds, for example, maleic acid, maleic acid esters, such as diethyl maleinate, itaconic acid, mesaconic acid, citraconic acid, acrylic acid, methacrylic acid, methylmethacrylate, furfural, allyl chloride, mesityl oxide and styrene. If maleic acid is used above 130° C., the anhydride will form which will then act as the dienophilic compound. Below 130° C. the maleic acid itself will form condensation products. As a side-reaction, however, a conversion of maleic acid into fumaric acid will take place; this is substantially insoluble in the reaction mixture and it therefore will not or only to a limited degree participate in the condensation reaction.

We may also use mixtures of different dienophilic compounds, e. g. maleic acid anhydride and styrene. They can be used simultaneously or successively.

If the iodine or the compound capable of generating iodine is added to the mixture of fatty acids and maleic acid anhydride, it is advantageous to do this after the mixture has become homogeneous. The temperature required therefore depends on the amount of maleic acid anhydride added. In most cases the catalyst will be added when the temperature is above 100° C. The addition is preferably effected after the mixture has reached the reaction temperature. If the iodine is added when maleic acid anhydride is still present as a separate phase, the iodine will react with the maleic acid anhydride to form a solid substance, which will precipitate from the reaction mixture.

It is also possible to heat the mixture of fatty acid and iodine or the compound capable of generating iodine to the reaction temperature before the maleic acid anhydride is added.

If styrene is used as a dienophilic compound there are advantages in adding this slowly to the reaction mixture in order to prevent the evaporation or the conversion into polystyrene of part of the styrene.

After the termination of the condensation reaction the iodine and the excess of maleic acid anhydride, if any, will generally be removed from the reaction mixture. This may be effected e. g. by distillation, the iodine and the maleic acid anhydride being recovered jointly or separately. They can be used again.

The iodine may also be removed, either from the reaction mixture or from the distillate, by means of activated zinc and water and recovered from the zinc iodide formed by means of chlorine.

Alternatively the maleic acid anhydride can be removed from the reaction mixture by washing with hot water.

The reaction product freed from the catalyst and from the excess of maleic acid anhydride can be used as such or the condensation products may be separated from the fatty acids and volatile esters, if any, which have not reacted with the condensing agent, by distillation in vacuo, the boiling point of the fatty acids being considerably lower than that of the condensation products. The same applies to the volatile esters, e. g. alkylesters of the fatty acids. If desired the condensation products may also be distilled in order to separate the same from non-volatile constituents.

Another method for separating condensation products and non reacted fatty acids is the treatment with a solvent, in which the fatty acids are readily soluble and the condensation products insoluble or poorly soluble. Examples of such solvents are aliphatic or cycloaliphatic hydrocarbons, e. g. petroleum ether.

The process according to the invention can be carried out, if desired, in the presence of a high-boiling, inert solvent, e. g. tetraline, decaline or other hydrocarbons, ketones, etc.

The natural oils and fats and the fatty acid mixtures obtained therefrom usually contain fatty acids of a different degree of unsaturation. From the unsaturated fatty acids having one double bond mono adducts will be obtained, whereas unsaturated fatty acids having two or more double bonds are capable of forming mono-adducts, di-adducts and possibly tri-adducts.

In many cases mono-adducts, in practice in other cases mixtures of mono-adducts with di- and tri-adducts will be preferred. One of the most important applications of these condensation products resides in the conversion thereof into further condensation products with glycols, diamines and the like and for this purpose the mono-adducts and di-adducts behave differently, because the mono-adducts contain three and the di-adducts five functional groups, which has a considerable influence on the properties of the condensation products with glycols and the like.

According to one embodiment of the invention the condensation with the dienophilic compound is conducted in such a manner that practically only mono-adducts are produced. This can be effected by using a proportion of dienophilic compound which is not in excess of 200 mol percent, preferably not in excess of 150 mol percent, calculated on the unsaturated fatty acids or on their esters, and to interrupt the reaction when mono-adducts but not yet appreciable amounts of di-adducts have formed.

It has been found that in general the unsaturated fatty acids are first condensed to mono-adducts and that only thereafter condensation of the dienophilic compound with the second and with further double bonds, if any, of the unsaturated fatty acids takes place. By proceeding in the manner indicated more particularly by using only a small excess of the dienophilic compound or less, it is possible to prevent these condensations from overlapping in an appreciable degree. The time of reaction will be more critical if a substantial excess of the dienophilic compound is used and if the fatty acids to be condensed have a higher degree of unsaturation. It is desirable, therefore when manufacturing condensation products from highly unsaturated fatty acids only to use a slight excess of the dienophilic compound if mono-adducts are desired. For the preparation of di- and tri-adducts a larger excess of maleic acid anhydride should be used and the time of reaction should be increased.

The condensation products obtained according to the invention from drying and semi-drying oils can be used in the lacquer industry in the usual way. The condensation products of fatty acids or their esters may also be converted into further condensation products by esterification or reesterification with glycols, diamines, etc.

The invention will be elucidated with reference to the following examples:

*Example 1*

100 grams of olein containing 0.31 gram mol of unsaturated fatty acids were heated with 42 grams, i. e. 0.43 gram mol of maleic acid anhydride to 200° C., whereupon 0.6 gram of iodine was added. The reaction mixture was heated to 200° C. for two hours, subsequently cooled to about 100° C. and worked up in the manner described in Example 1. 16 grams of maleic acid anhydride were recovered, so that 26 grams, i. e. 0.265 gram mol, had reacted.

It was found that the distillate contained 0.06 gram mol of unsaturated fatty acid, so that 0.25 gram mol of fatty acid had reacted with the maleic acid anhydride. This shows that almost exclusively mono-adducts and only a very small proportion of di-adducts were formed.

*Example 2*

80 grams of a fatty acid mixture consisting of about 15% of saturated fatty acids and about 85% of oleic acid, in which no unsaturated fatty acids were to be found, were heated for two hours to 200–210° C. with 40 grams of maleic acid anhydride and 0.24 gram of iodine. After working up of the reaction mass, including washing out free maleic acid anhydride, 22 grams of maleic acid anhydride were found to have reacted. By distilling the reaction product in vacuo 12 grams of fatty acid were recovered; the residue amounted to 90 grams. It could thus be calculated that of the 0.24 mol of oleic acid in the starting product 0.22 mol had reacted, i. e. more than 90%.

*Example 3*

1 kg. of oleine was agitated for two hours at a temperature of 200–210° C. with 420 grams of maleic acid anhydride and 3 grams of iodine. From the reaction mass 140 grams of maleic acid anhydride could be washed out; consequently 280 grams of maleic acid anhydride were bound.

The condensation product formed had substantially the same properties as the product obtained according to Example 2. Since in the latter case the reaction product is an oleic acid adduct it can be concluded that also in the present example the reaction product also for the greater part consists of this oleic acid adduct. This is also shown by the high yield obtained, for the oleine used as a starting product contained about 75% oleic acid and about 10% of linoleic acid.

We claim:

1. A process of manufacturing condensation products which comprises heating a fatty material selected from the group consisting of mono-unsaturated higher fatty acids, esters of said fatty acids, mixtures of said fatty acids and esters thereof with saturated fatty acids and esters, and mixtures of said fatty acids and esters with minor amounts of more unsaturated fatty acids and esters, with a dienophilic compound selected from the group consisting of maleic acid, maleic anhydride and methacrylic acid, in the presence of a catalyst selected from the group consisting of iodine, hydroiodic acid, iodine mono-chloride, iodine trichloride, iodine mono-bromide, iodine fluoride, iodoform, hydroiodic acid salts of organic bases and zinc iodide.

2. A process according to claim 1 in which the proportion of catalyst is 0.1–2%, calculated on the fatty material.

3. A process according to claim 1 in which the proportion of catalyst is 0.3–1%, calculated on the fatty material.

4. A process according to claim 1 in which the reaction is carried out at a temperature of between 175° and 250° C.

5. A process according to claim 1 in which the catalyst is added to the mixture of fatty material and dienophilic compound at a temperature at which said mixture has become homogeneous.

6. A process according to claim 1 in which the catalyst is added to the mixture of fatty material and dienophilic compound after the same has been heated to the reaction temperature.

7. A process according to claim 1 in which the reaction is carried out in a solvent.

8. A process according to claim 1 in which the fatty material is commercial oleic acid.

References Cited in the file of this patent

UNITED STATES PATENTS

| | | |
|---|---|---|
| 2,188,882 | Clocker | Jan. 30, 1940 |
| 2,275,843 | Clocker | Mar. 10, 1942 |
| 2,567,409 | Trent | Sept. 11, 1951 |
| 2,678,934 | Grummitt | May 18, 1954 |